United States Patent
Purohit et al.

(10) Patent No.: US 11,816,934 B2
(45) Date of Patent: Nov. 14, 2023

(54) SMART AIRPORT AND CABIN SYSTEM TO AVOID TOUCH POINTS AND MAINTAIN SOCIAL DISTANCING

(71) Applicant: The Boeing Company, Chicago, IL (US)

(72) Inventors: Suresh Kumar Purohit, Bengaluru (IN); Sandeep Patil, Bengaluru (IN); Sandhya Sharma, Bengaluru (IN); Thulasi Gopalakrishnan Nair, Bengaluru (IN)

(73) Assignee: The Boeing Company, Chicago, IL (US)

( * ) Notice: Subject to any disclaimer, the term of this patent is extended or adjusted under 35 U.S.C. 154(b) by 132 days.

(21) Appl. No.: 17/448,931

(22) Filed: Sep. 27, 2021

(65) Prior Publication Data
US 2022/0189227 A1    Jun. 16, 2022

Related U.S. Application Data

(60) Provisional application No. 63/126,071, filed on Dec. 16, 2020.

(51) Int. Cl.
*G07C 9/22* (2020.01)
*B64D 11/00* (2006.01)
(Continued)

(52) U.S. Cl.
CPC .......... *G07C 9/22* (2020.01); *B64D 11/00155* (2014.12); *B64D 13/06* (2013.01);
(Continued)

(58) Field of Classification Search
CPC ........ G07C 9/00896; G07C 9/10; G07C 9/22; G06F 21/35; G06F 21/40; G06Q 50/30; G06Q 10/02
See application file for complete search history.

(56) References Cited

U.S. PATENT DOCUMENTS

2006/0124734 A1 * 6/2006 Wallerstorfer ......... G07C 9/253
235/382
2008/0191009 A1 * 8/2008 Gressel ................ H04W 4/021
235/382
(Continued)

FOREIGN PATENT DOCUMENTS

CN   111898580 A   11/2020
KR   102134903 B1   7/2020
WO   2019183662 A1   10/2019

OTHER PUBLICATIONS

European Patent Office Extended Search Report, dated May 16, 2022, regarding Application No. 21214304.4, 9 pages.

*Primary Examiner* — Vernal U Brown
(74) *Attorney, Agent, or Firm* — Yee & Associates, P.C.

(57) ABSTRACT

A system enabling hands-free operation of controls for accessing a transportation vehicle is provided. The system comprises code readers associated with respective entry barriers for admitting passengers to a transportation vehicle. The code readers read a machine-readable passenger code generated by a mobile electronic device and actuate mechanisms allowing entry through the barriers responsive confirmation of the code. A signal receiver in communication with a Passenger Service Unit for passenger seat onboard the vehicle receives instructions from the mobile electronic device and instruct the PSU to actuate passenger cabin controls for the passenger seat. An application on the mobile electronic device determines a time-stamped temperature of a passenger and generates the passenger code, which includes passenger identification, authorization to pass through the entry barriers and board the vehicle, and a determination if the temperature of the passenger indicates an acceptable passenger health status.

22 Claims, 12 Drawing Sheets

(51) Int. Cl.
*G07C 9/10* (2020.01)
*G06V 40/16* (2022.01)
*B64D 13/06* (2006.01)
*G06K 7/14* (2006.01)
*G06Q 10/02* (2012.01)
*G06Q 50/30* (2012.01)

(52) U.S. Cl.
CPC .......... *G06K 7/1417* (2013.01); *G06Q 10/02* (2013.01); *G06Q 50/30* (2013.01); *G06V 40/172* (2022.01); *G07C 9/10* (2020.01); *B64D 2013/0655* (2013.01)

(56) References Cited

U.S. PATENT DOCUMENTS

| | | | |
|---|---|---|---|
| 2014/0358594 A1* | 12/2014 | Antonakakis | G07C 9/22 705/5 |
| 2016/0311348 A1 | 10/2016 | Watson et al. | |
| 2017/0283086 A1 | 10/2017 | Garing et al. | |
| 2019/0239757 A1 | 8/2019 | Berkey et al. | |
| 2020/0151984 A1* | 5/2020 | Van Put | H04W 12/06 |

* cited by examiner

SMART AIRPORT AND CABIN SYSTEM TO AVOID TOUCH POINTS AND MAINTAIN SOCIAL DISTANCING

CROSS-REFERENCE TO RELATED APPLICATION

This application claims the benefit of U.S. Provisional Patent Application Ser. No. 63/126,071, filed Dec. 16, 2020, and entitled "Smart Airport and Cabin System to Avoid Touch Points and Maintain Social Distancing;" which is incorporated herein by reference in its entirety.

BACKGROUND INFORMATION

1. Field

The present disclosure relates generally to an improved computer system and, in particular, to a method and apparatus for allowing travelers to access doors and elevators at a facility and operate onboard cabin controls in a hands-free manner.

2. Background

The spread of communicable diseases can be reduced by avoiding touching common touch points and by maintaining minimum distances between people. Transportation facilities such as airports and train stations contain many points of physical contact shared by passengers such as, e.g., ticket counters/kiosks, door handles, elevator buttons, as well as passenger cabin controls such as lights, entertainment selection controls, etc.

Furthermore, passengers tend to congregate in close proximity to each other during boarding and de-boarding of transportation vehicles while waiting for their turn. Currently, priority boarding and deboarding based on, e.g., connecting flight, senior citizen status, infants and small children, special abled people, travel class, etc. is done manually.

Therefore, it would be desirable to have a method and apparatus that take into account at least some of the issues discussed above, as well as other possible issues.

SUMMARY

An illustrative embodiment provides a system enabling hands-free operation of controls for accessing a transportation vehicle. The system comprises a number of code readers, wherein each code reader associated with a respective authorized-access entry barrier for admitting passengers to a transportation vehicle. The code readers are configured to read a machine-readable passenger-characterizing code generated by a mobile electronic device and actuate mechanisms allowing entry through the entry barriers responsive to successful confirmation of the passenger-characterizing code. A signal receiver in communication with a Passenger Service Unit (PSU) associated with a respective passenger seat onboard the transportation vehicle receives control instructions from the mobile electronic device and responsively instruct the PSU to actuate a number of passenger cabin controls for the passenger seat. An application executable on the mobile electronic device determines a time-stamped temperature of a passenger. The application generates the passenger-characterizing code, wherein the passenger-characterizing code includes passenger identification, authorization to pass through the entry barriers and board the transportation vehicle, and a determination if the time-stamped temperature of the passenger is below a specified threshold indicating an acceptable passenger health status.

Another illustrative embodiment provides a method of hands-free operation of controls for accessing a transportation vehicle. The method comprises reading, by a number of code readers, a machine-readable passenger-characterizing code generated by a mobile electronic device. Each code reader is associated with a respective authorized-access entry barrier for admitting passengers to a transportation vehicle. The code readers actuate mechanisms allowing entry through the entry barriers responsive to successful confirmation of the passenger-characterizing code. The passenger-characterizing code includes passenger identification, authorization to pass through the entry barriers and board the transportation vehicle, and a determination if a time-stamped temperature of a passenger is below a specified threshold indicating an acceptable passenger health status. A signal receiver in communication with a PSU associated with a respective passenger seat onboard the transportation vehicle receives control instructions from the mobile electronic device. The mobile electronic device obtains controls specific to the passenger seat by reading a code on the passenger seat. The signal receiver instructs the PSU to actuate a number of passenger cabin controls for the passenger seat responsive to receiving the control instructions from the mobile electronic device.

Another illustrative embodiment provides a method of hands-free operation of controls for accessing a transportation vehicle. The method comprising determining, with a mobile electronic device, a time-stamped temperature of a passenger. An application executable on the mobile electronic device generates a machine-readable passenger-characterizing code that includes passenger identification, authorization to pass through the entry barriers and board the transportation vehicle, and a determination if the temperature of the passenger is below a specified threshold indicating an acceptable passenger health status. The mobile electronic device displays the passenger-characterizing code to a number of code readers, wherein each code reader is associated with a respective authorized-access entry barrier for admitting passengers to a transportation vehicle. The code readers actuate mechanisms allowing entry through the entry barriers responsive to successful confirmation of the passenger-characterizing code. Control instructions are sent with the mobile electronic device to a signal receiver in communication with a PSU associated with a respective passenger seat onboard the transportation vehicle. The signal receiver instructs the PSU to actuate a number of passenger cabin controls for the passenger seat responsive to receiving the control instructions from the mobile electronic device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the spread of communicable diseases can be reduced by avoiding touching common touch points and by maintaining minimum distances between people.

The illustrative embodiments also recognize and take into account that transportation facilities such as airports and train stations contain many points of physical contact shared by passengers such as, e.g., ticket counters/kiosks, door handles, elevator buttons, as well as passenger cabin controls such as lights, entertainment selection controls, etc. Currently, there are no solutions available to avoid passenger and crew touch points and maintaining social distancing throughout a journey, starting from the entrance of the originating facility to the exit of the destination. Payments are made through cash or credit/debit cards involving the purchaser operate carder reader controls touched by others. Currently, the online order for food courts and counters in airports and other transportation facilities is not available.

The illustrative embodiments also recognize and take into account that passengers tend to congregate in close proximity to each other during boarding and de-boarding of transportation vehicles while waiting their turn. Currently, priority boarding and deboarding based on, e.g., connecting flight, senior citizen status, infants and small children, special abled people, travel class, etc. is done manually.

The illustrative embodiments provide a mobile based application which interacts with controls at transportation facilities and vehicle such as doors, elevators, windows, buttons, AC control, entertainment system, and others. Passenger authentication is handled through machine-readable (e.g., QR) code scanners connected the control surface or by passenger name record (PNR) validation. Code scanning and PNR authentication by the mobile application can control the surface used for common doors, windows, and buttons in the facility and vehicle. Real time thermal screening of passengers and crew is incorporated into the codes to provide health screening of potentially infectious people.

Social distancing can be maintained at counters and while boarding/de-boarding by alerting passengers about their turn, thereby avoiding a rush at the counters or the pathways. Passenger priorities for boarding and de-boarding are validated by a passenger database system application within predefined rules established by the authorities.

Figure 1:
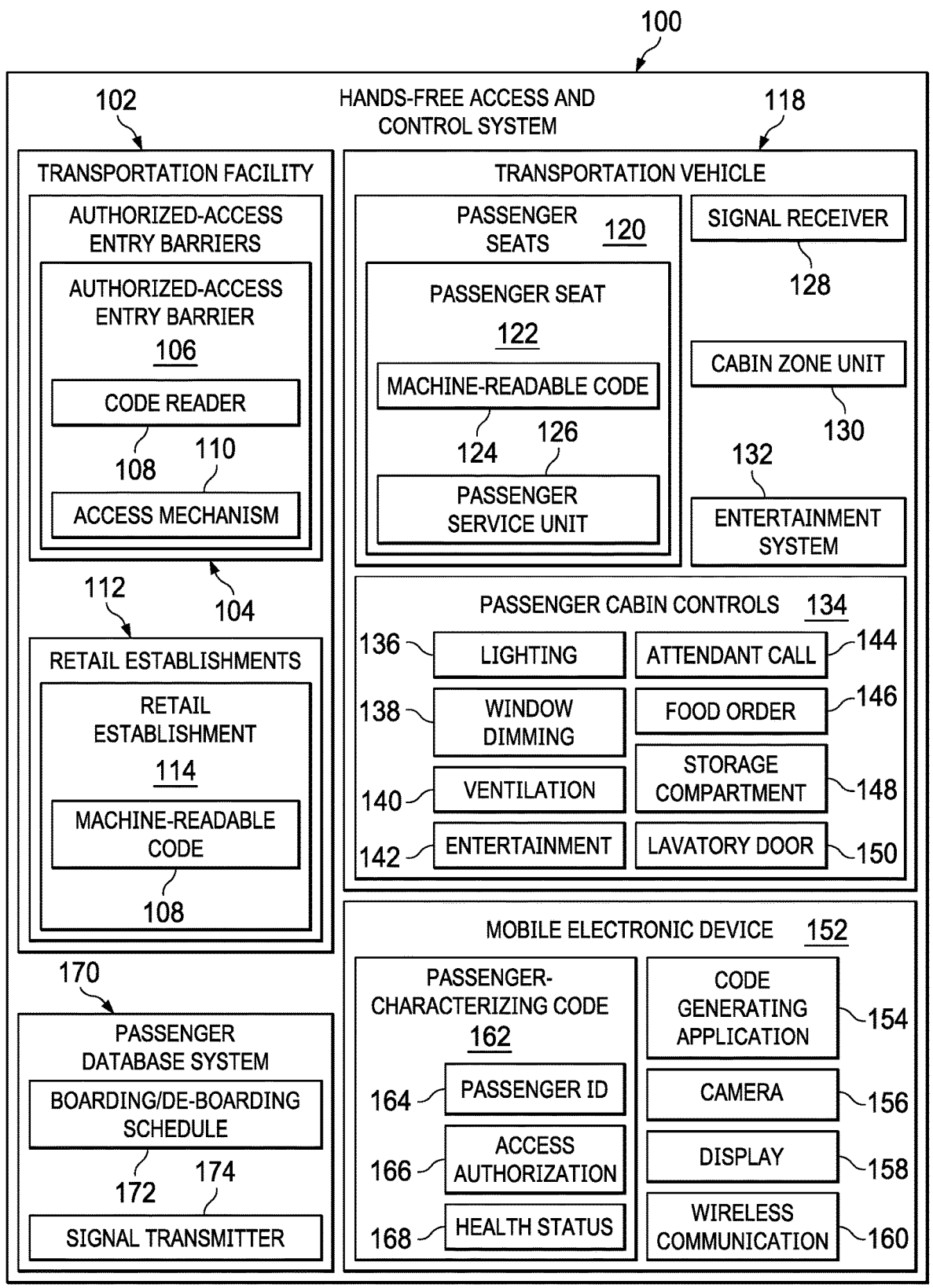
FIG. 1 is an illustration of a block diagram of a hands-free access and control system in accordance with an illustrative embodiment.

With reference now to the figures and, in particular, with reference to FIG. 1, an illustration of a block diagram of a hands-free access and control system is depicted in accordance with an illustrative embodiment. Access and control system 100 comprises mechanisms and controls in a transportation facility 102 and transportation vehicle 118 that can be accessed and controlled by a passenger via mobile electronic device 152, allowing the passenger to enter and move through the facility 102 and access its amenities, board the vehicle 118 and operate passenger cabin controls 134 during travel, de-board, and exit the destination facilities without having to touch physical surfaces that are normally common points of contact among passengers and crew.

Transportation facility 102 comprises a number of authorized-access entry barriers 104 that allow entry into and through transportation facility 102 as well as access to transportation vehicle 118 only to passengers and crew who are authorized to enter particular areas of the facility 102 or board the vehicle 118. Examples of entry barriers 104 might include a transportation facility entrance/exit, a retail establishment entrance within the transportation facility 102, an elevator, a vehicle entrance (i.e. gate, gangway), or a lavatory door.

Each entry barrier 106 comprises a code reader 108 configured to read a passenger-characterizing code 162 (a machine-readable code) from a mobile electronic device 152. Code reader 108 is further configured to actuate an access mechanism 110 to allow entry through the entry barrier 106 responsive to successful confirmation of the passenger-characterizing code 152.

Mobile electronic device 152 comprises a code generating application 154 that generates passenger-characterizing code 162. Passenger-characterizing code 162 might comprise passenger identification 164, and an access authorization (PNR) 166 or gate-specific boarding pass to pass through the gate entry barriers 104 and board the transportation vehicle 118, and a determination that the time-stamped temperature of the passenger is below a specified threshold indicating an acceptable passenger health status 168. The time-stamped temperature can be taken at the time of the passenger's arrival at the transportation facility 102 and sent to mobile electronic device 152 via the device's wireless communication 160 such as email or text, which can then be passed to code generating application 154.

Transportation facility 102 might also comprises a number of retail establishments 112 such as, e.g., food court, restaurants, stores, etc. Each retail establishment 114 might have an associated machine-readable retail code (e.g., quick response (QR)) 116 that a passenger can read with a camera 156 on a mobile electronic device 152. Upon reading the retail code, mobile electronic device 152 displays an ordering interface for the retail establishment 114 on display 158, allowing the passenger to place an order without having to stand in close proximity to other patrons/passengers or retail employees or having to touch a common set of controls (e.g., touchscreen order kiosk) used by other people. Each retail establishment 114 might have a unique code 116, or a common code might be shared by a group of retail establishments 112 such as in a food court, allowing the passenger to order from multiple retailers through one interface.

Transportation vehicle 118 (e.g., an airplane or train) comprises a number of passenger seats 120. Each passenger seat 122 has a unique machine-readable code 124 (QR code) associated with it that can be scanned with camera 156 on mobile electronic device 152, thereby giving the passenger access to passenger cabin controls 134 specific to that seat. Passenger cabin controls 134 might comprise controls for lighting 136, window dimming 138, air conditioning ventilation 140, entertainment 142, attendant call 144, food order 146, storage compartment 148, and lavatory door 150. An interface for passenger cabin controls 134 can be displayed on display 158 on mobile electronic device 152.

Signal receiver 128 is in communication with a Passenger Service Unit (PSU) 126 associated with the respective passenger seat 122 onboard the transportation vehicle 118. Signal receiver 128 is configured to receive control instructions from mobile electronic device 152 and responsively instruct PSU 126 to actuate passenger cabin controls 134 for passenger seat 122. For example, the mobile electronic device (and application executable on the mobile electronic device) may receive an input of a requested adjustment to a passenger cabin control such as lighting or air ventilation adjustment for a passenger service unit (PSU), and the mobile electronic device and application responsively generates a wireless signal or control instruction for instructing the PSU associated with the respective passenger seat to actuate a servo-motor or similar device for adjusting the passenger cabin control and/or PSU associated with the respective passenger seat.

Cabin zone unit (CZU) 130 manages communications with PSU 126 and onboard entertainment system 132 and functions as a switch within a cabin network system. CZU 130 connects peripheral equipment to a networking server (not shown).

Passenger database system 170 comprises information about passengers traveling aboard transportation vehicle 118, including passenger IDs as well as information regarding boarding and de-boarding priority, e.g., connecting flight, senior citizen status, infants and small children, special abled people, travel class, etc. From this information boarding/de-boarding schedule 172 is generated. Signal transmitter 174 is in communication with the passenger database system 170 and sends a signal to the mobile electronic device 152 containing a boarding or de-boarding schedule notice specific to the passenger identification 164, thereby avoiding crowding and close proximity contact between passengers in anticipation of boarding and de-boarding.

Figure 2:
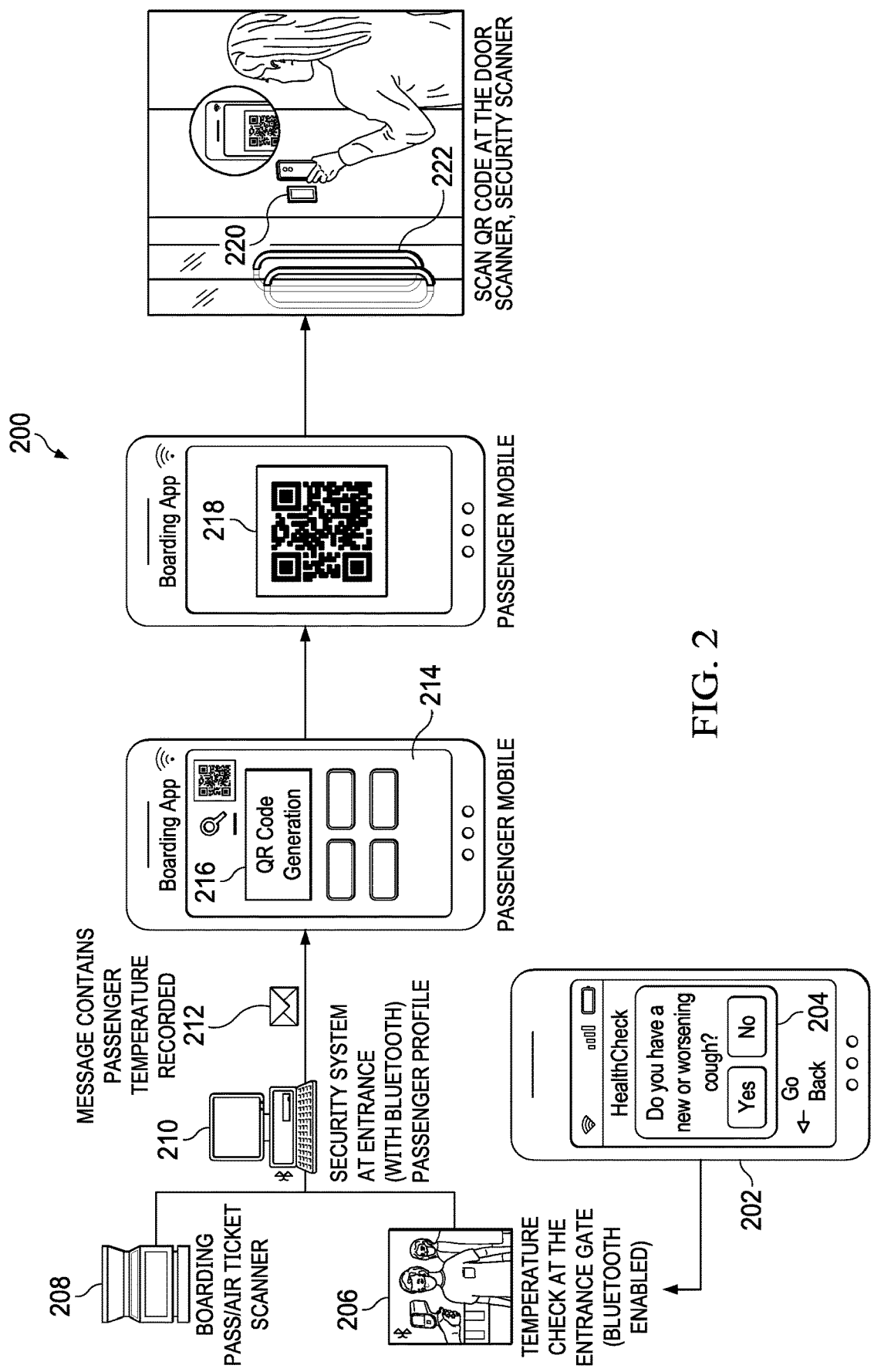
FIG. 2 illustrates a process for gaining access through entry barriers in a hands-free manner in accordance with an illustrative embodiment.

FIG. 2 illustrates a process for gaining access through entry barriers in a hands-free manner in accordance with an illustrative embodiment. Process 200 might be used upon initial entry into a transportation facility and to access specified areas in the facility.

The passenger might begin by answering health questions present in an interface 204 on mobile electronic device 202. Upon arrival that the transportation facility, the passenger undergoes a temperature check 206 which is time stamped and enters ticket or boarding pass information at ticket scanner 208. Security system 210 receives the ticket/boarding pass information and the timestamped temperature reading. The temperature reader might be Bluetooth® enabled (or similar wireless capability). The security system 210 may send a message 212 to the mobile electronic device 202 containing the timestamped passenger temperature information, or the mobile electronic device 202 may alternatively detect passenger temperature information (using infrared scanning, for example).

The passenger can then use a code generation option 216 in interface 214 on the mobile electronic device 202 to create a passenger-characterizing code 218 comprising a QR code that can be displayed on the mobile electronic device. When the passenger approaches a door 222 in the facility, the passenger displays the QR code 218 to a code reader 220, which controls an actuator to open the door upon successful validation of the code, allowing the passenger entry. Such a code reader 220 may be an HM20IC QR code scanning reader sold by HCC Technologies, for example.

Figure 3:
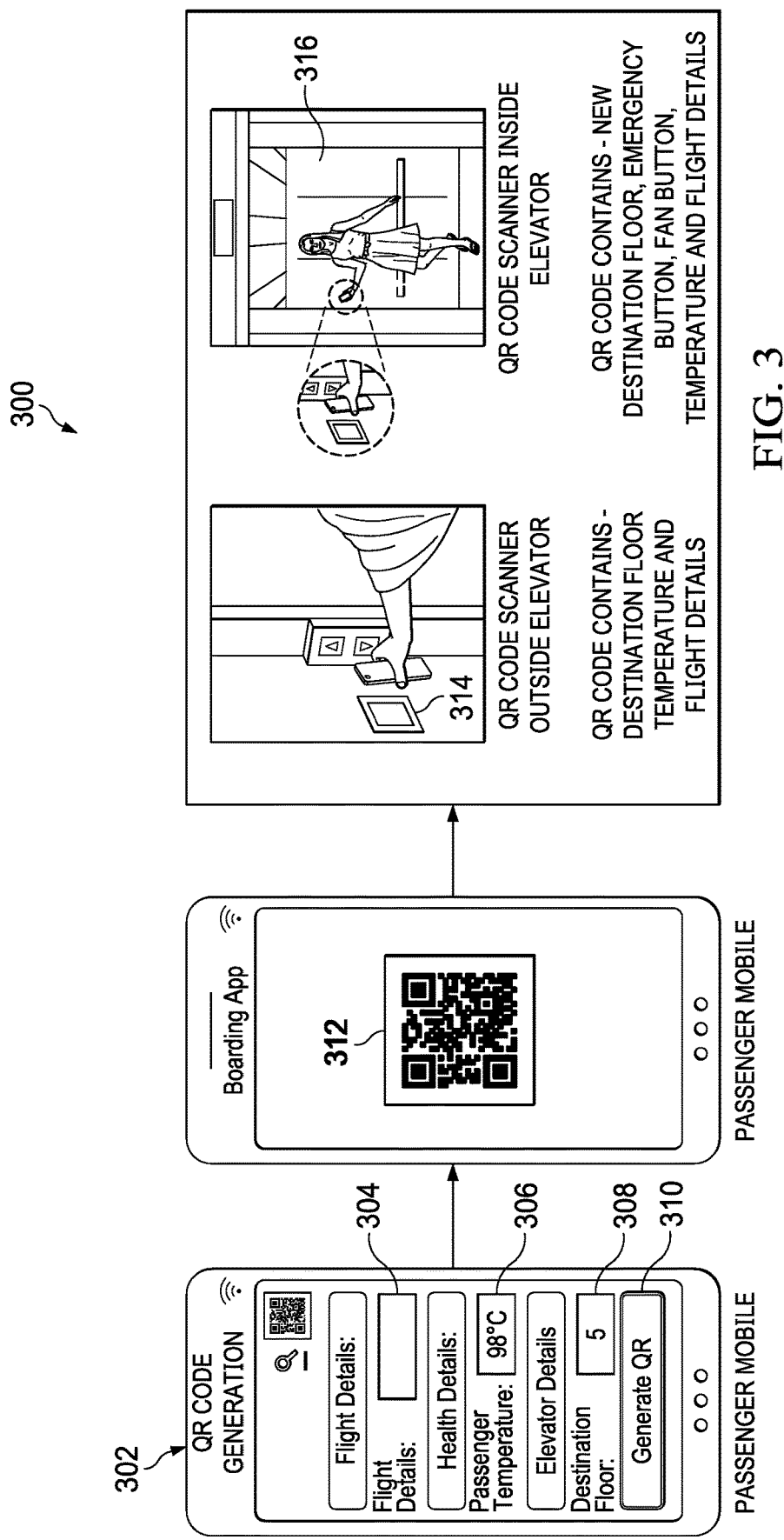
FIG. 3 illustrates a process for using an elevator in a hands-free manner in accordance with an illustrative embodiment.

FIG. 3 illustrates a process for using an elevator in a hands-free manner in accordance with an illustrative embodiment. Process 300 is similar to process 200.

Upon approaching an elevator, the passenger uses interface 310 on mobile electronic device 302 to enter destination floor 308. The passenger's timestamped temperature 306 and flight details 304 are acquired from the message received by a security system such as system 210 in FIG. 2. The passenger then uses interface 310 to generate a passenger-characterizing code comprising QR code 312.

The passenger displays the QR code to a code reader 314 to call the elevator. Once inside the elevator 316, the passenger can generate a new QR code to scan inside the elevator. The new QR code might change the destination floor, place an emergency call, or adjust ventilation.

Figure 4:
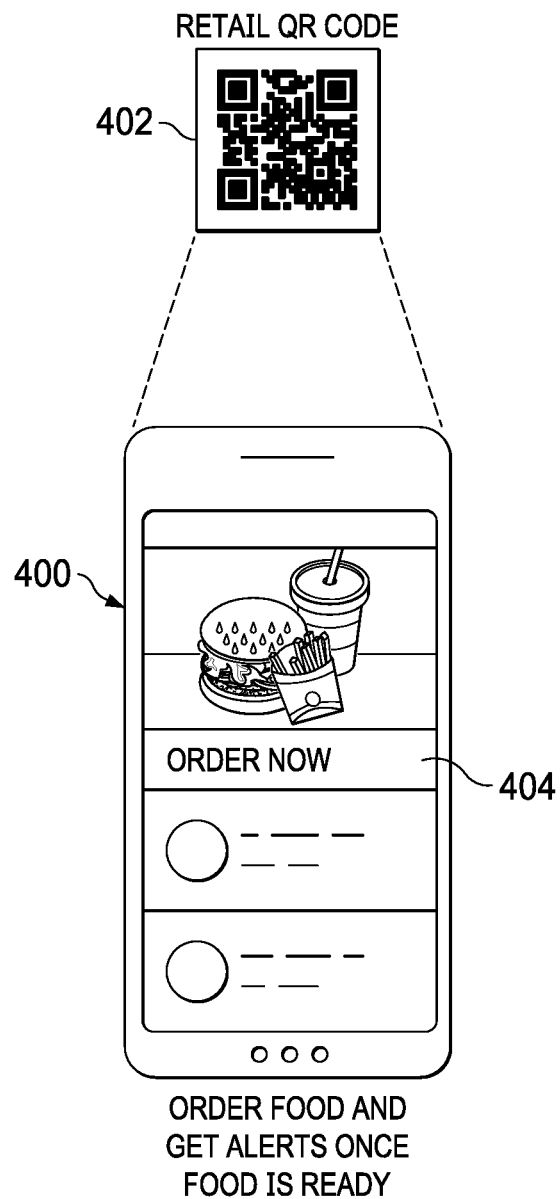
FIG. 4 illustrates in-person retail purchasing in a hands-free manner in accordance with an illustrative embodiment.

FIG. 4 illustrates in-person retail purchasing in a hands-free manner in accordance with an illustrative embodiment. Upon scanning retail QR code 402, mobile electronic device 400 displays an interface 404 that allows the passenger to place an order from a retail establishment in the transportation facility.

In an embodiment, the mobile application will list all shops in the transportation facility and provide a notice when an order is ready for pickup. The mobile application can also be used to order food on the transportation vehicle during travel. An electronic wallet payment method can also be integrated with the mobile application to reduce contact.

Figure 5:
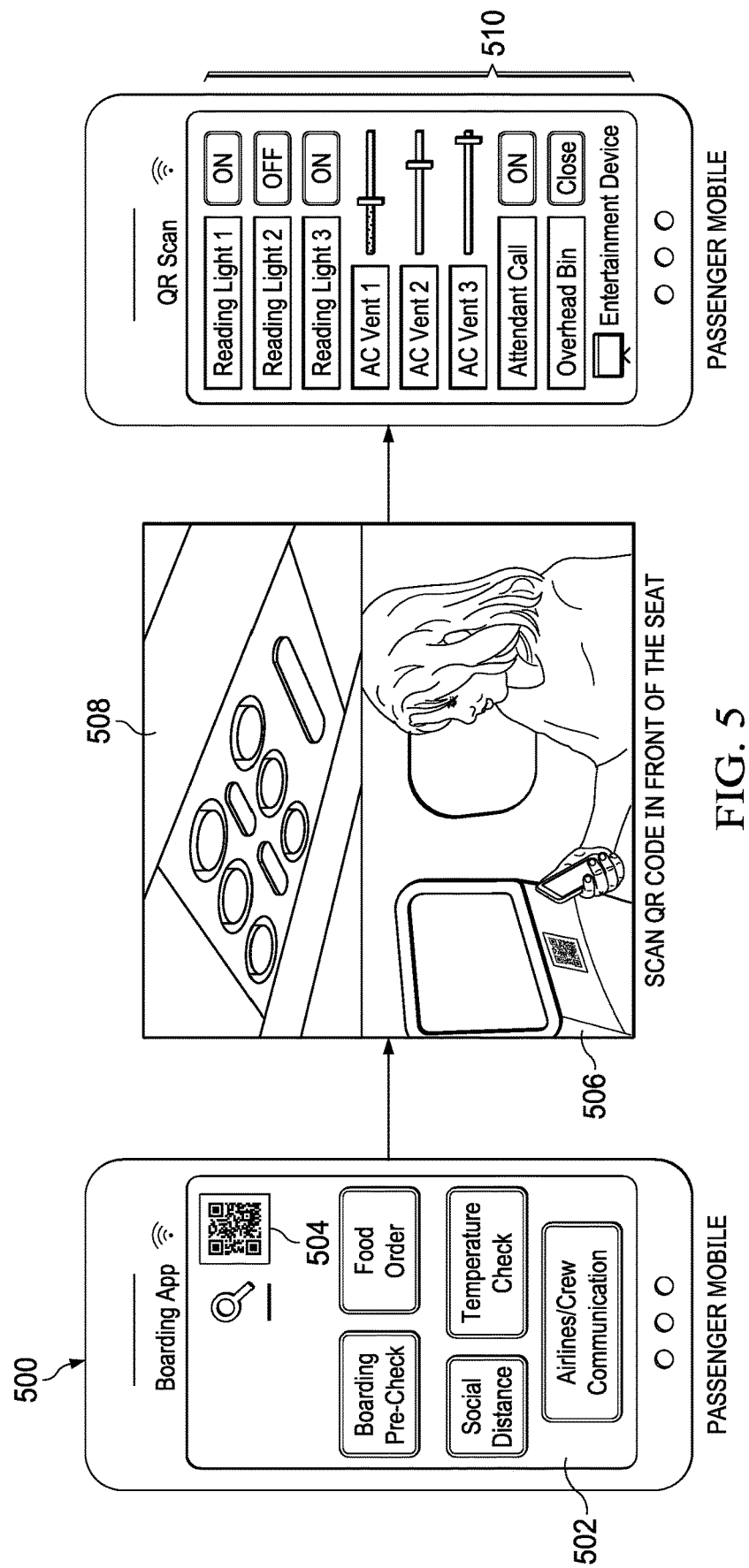
FIG. 5 illustrates a process for using passenger cabin controls in a hands-free manner in accordance with an illustrative embodiment.

FIG. 5 illustrates a process for using passenger cabin controls in a hands-free manner in accordance with an illustrative embodiment. The passenger uses an interface 502 on mobile electronic device 500 to scan a QR code 504 that is located on the seatback 506 in front of the passenger. This QR code 504 is unique to the passenger cabin controls 508 associated with the passenger's seat. Upon scanning the code 504, touch controls 510 for the passenger cabin controls 508 are displayed on the mobile electronic device, allowing the passenger to adjust lighting, ventilation, entertainment, etc.

Once QR code is scanned the passenger will see control buttons 508 to turn on/off the reading lights and sliding scale to adjust the AC vent specific to his/her seat. For example, if Passenger is seated at seat no. 1A then the controls of AC vent and reading light of seat 1A will be displayed on the mobile electronic device, along with an attendant call button as it is common for all the seats in that row. Additionally, the mobile electronic device will show the icon for entertainment device in front of his/her seat and control button for overhead bin.

Figure 6A:
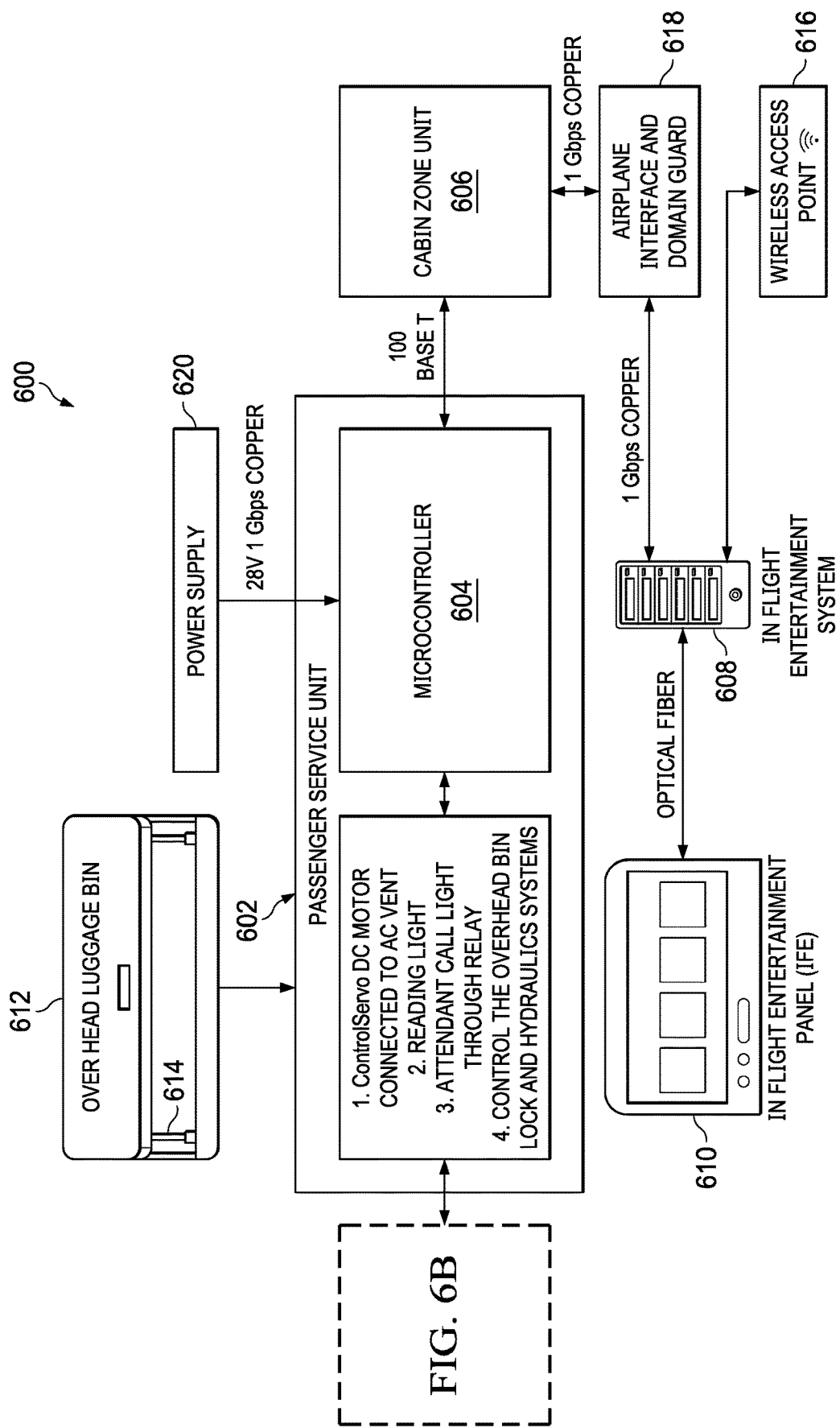
FIG. 6A illustrates a block diagram of a hands-free passenger cabin control system in accordance with an illustrative embodiment.
Figure 6B:
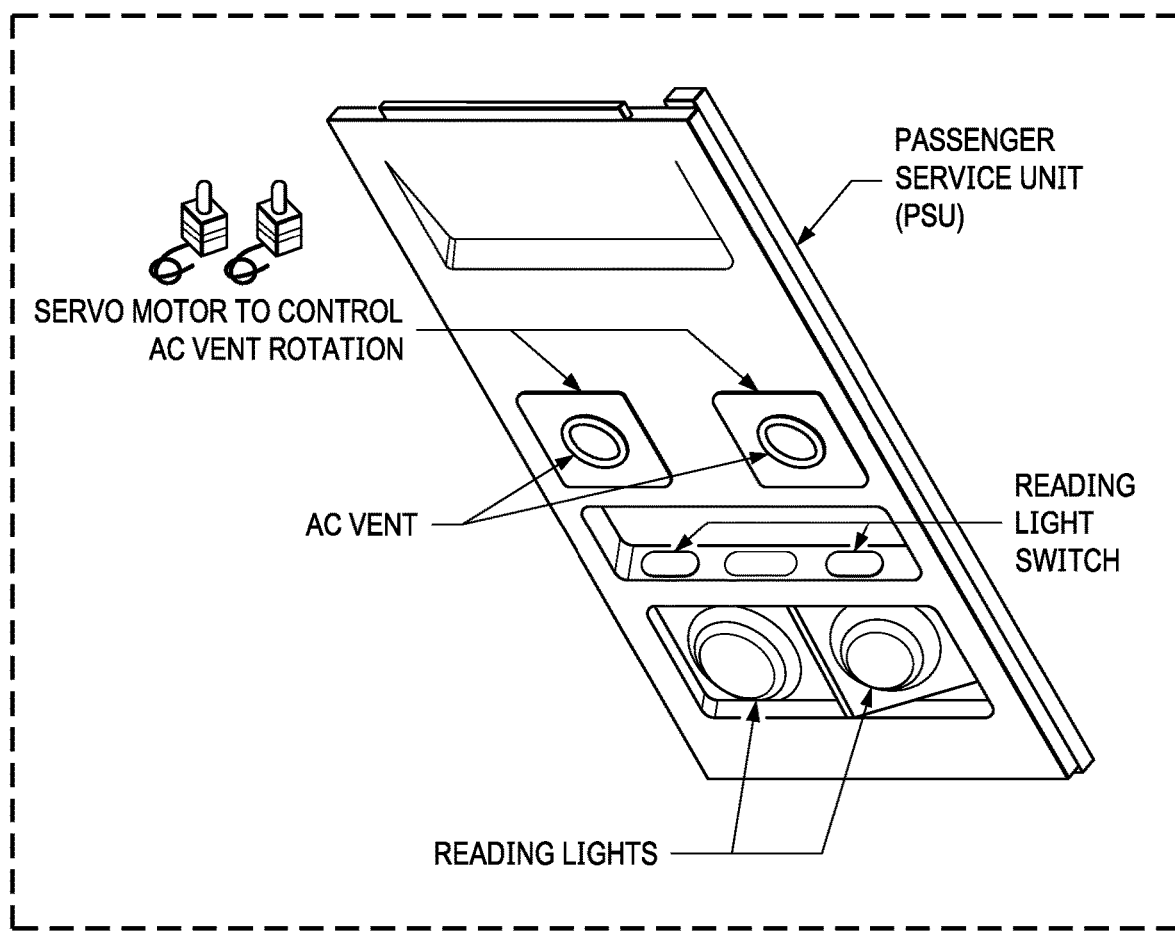
FIG. 6B illustrates a hands-free passenger cabin control system panel in accordance with an illustrative embodiment.

FIG. 6A illustrates a block diagram of a hands-free passenger cabin control system in accordance with an illustrative embodiment. FIG. 6B illustrates a hands-free passenger cabin control system panel in accordance with an illustrative embodiment. System 600 might be an example of a detailed view of passenger cabin controls 134 in FIG. 1. In the present example, system 600 is aboard an airplane.

Passenger service unit (PSU) 602 includes microcontroller 604 and is powered by power supply 620. PSU 602 provides local discrete I/O capability and power outputs to various lights in the cabin. PSU 602 hosts functionality for local passenger reading and attendant call light control and provides a connection to an air conditioning (A/C) vent servo motor which rotates the A/C vent based on the user input. As shown in FIG. 6B, passenger A/C vents are fitted with servo motors controlled by PSU 602 the same way as the reading lights are controlled.

CZU 606 primarily functions as a switch within the cabin network system, connecting peripheral equipment back to the networking server. In addition, CZU 606 also hosts some of the functions required for cabin management and control, including includes managing communication with Passenger PSU 602.

The In-Flight Entertainment System (IFES) 608 provide communications and entertainment functions in the cabin. IFES 608 makes available to the passengers several types of entertainment such as games, off-board connectivity, and On-Demand audio and video. IFES 608 also provides the passenger services functions of reading lights and attendant call functions at each passenger seat through IFES panel 610 or the mobile electronic device. IFES 608 is connected to the CZU 606, which in turn is connected to PSU 602. IFES 608 can provide the current status of passenger controls on the mobile electronic device and panel 610.

Airplane interface and domain guard 618 is an avionics least recently used (LRU) caching scheme that provides connectivity that discards the least recently used items from memory first when a cache become full.

Overhead luggage bin 612 is fitted with electric linear hydraulics 614 to open and close the bin. Hydraulics 614 are powered and controlled by PSU 602. Once PSU 602 receives a command from a passenger through IFES 608 and CZU 606, the PSU 602 unlocks overhead bin 612 and starts extracting the hydraulics 614, and the attached bin door will open. Conversely, when close command is received the hydraulics piston/rod will be retracted, and the bin door will close and lock. An infrared beam sensor might be located in overhead bin 612 to prevent closing of the door when an object or person is in between the door.

The passenger uses a personal mobile electronic device to scan the QR code posted in front of the passenger's seat. The QR code contains the information of seat number and connects to the aircraft passenger wireless access point (WAP) 616, which establishes communication between the mobile electronic device and the IFES 608. The QR code might contains information regarding which control page needs to be displayed on by the mobile application.

When the passenger uses the A/C vent control sliding bar (see FIG. 5), the specific value (i.e. from 0 to 360 degree) is sent to IFES 608, and from there the AC control value is sent to cabin zone unit CZU 606 then to PSU 602. PSU 602 sends an equivalent electric signal (voltage) to the specific servo motor which rotates the AC vent knob. By using Sliding bar on the mobile electronic device interface, the passenger can control the AC vent opening and closing.

As another example, when the passenger selects reading light button to "On" from the mobile electronic device, the specific digital value is sent to IFES 608 through wireless access point (WAP) 616. IFES 608 sends the command to CZU 606, which then forwards it to PSU 602. PSU 602 controls the reading light through a relay switch.

The passenger can use the entertainment device icon on the mobile electronic device interface to display all the controls available in the physical entertainment device 610 in front of the passenger's seat. When the passenger uses a control to input a command the specific coded value is sent to IFES 608, which is directly connected to the entertainment device 610 that performs the requested operation as if the command were received directly by the entertainment device 610 itself.

The mobile application might have all control pages preloaded, and these pages will have coded values which the IFES 608 will understand. Based on the QR code scan, respective pages can be displayed. Alternatively, the QR code itself can have the information about the control pages to be displayed on the mobile electronic device.

Figure 7:
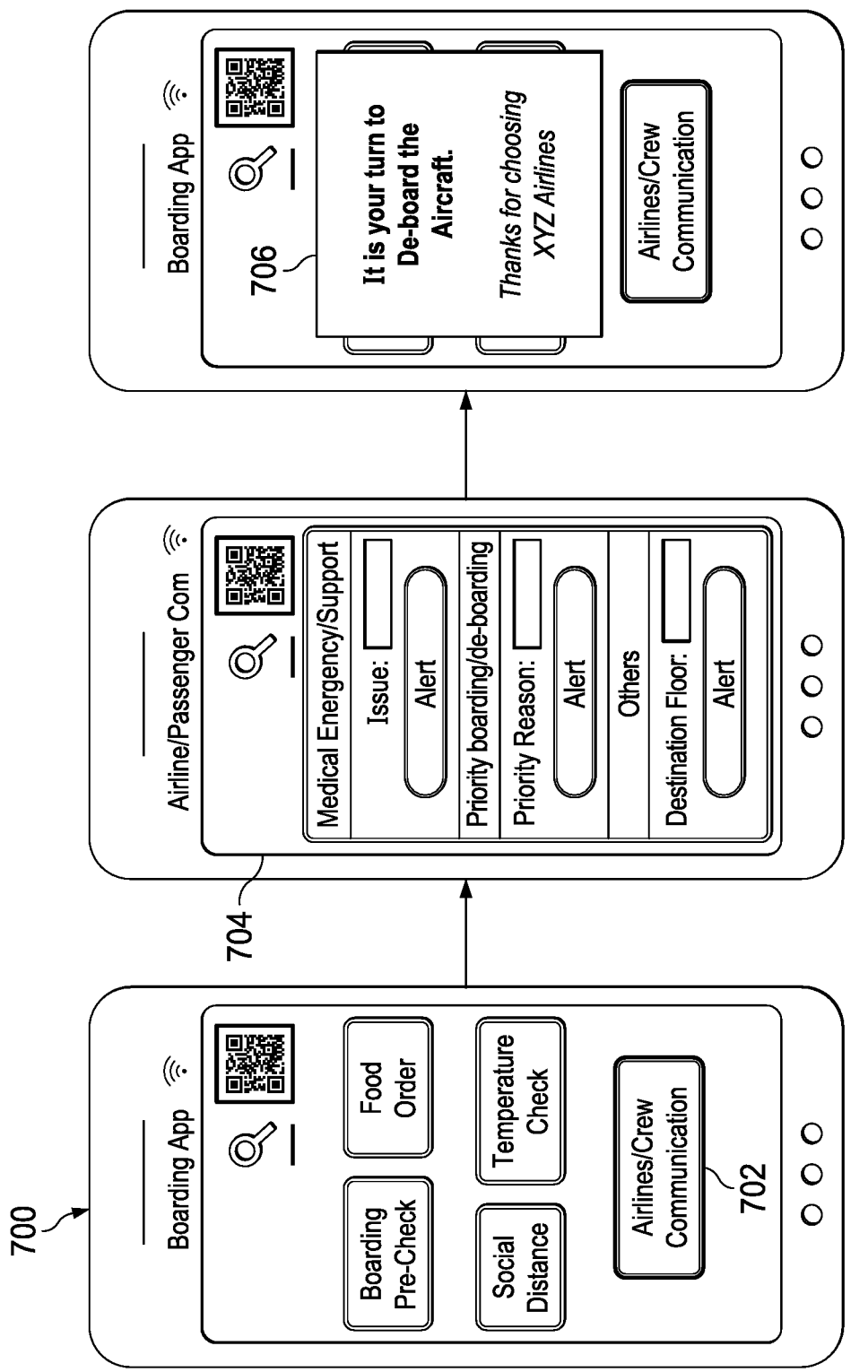
FIG. 7 illustrates use of a mobile electronic device for boarding and deboarding in accordance with an illustrative embodiment.

FIG. 7 illustrates use of a mobile electronic device for boarding and deboarding in accordance with an illustrative embodiment. By selecting button 702 on mobile electronic device 700, the passenger is presented with an interface 704 that allows the passenger to enter specific information related to boarding/de-boarding priority, which is communicated directed to the airline or other transportation provider (e.g., passenger database system 170 in FIG. 1). When it is the passenger's turn to board or de-board the vehicle, a notice 706 is sent to and displayed by the mobile electronic device.

Figure 8:
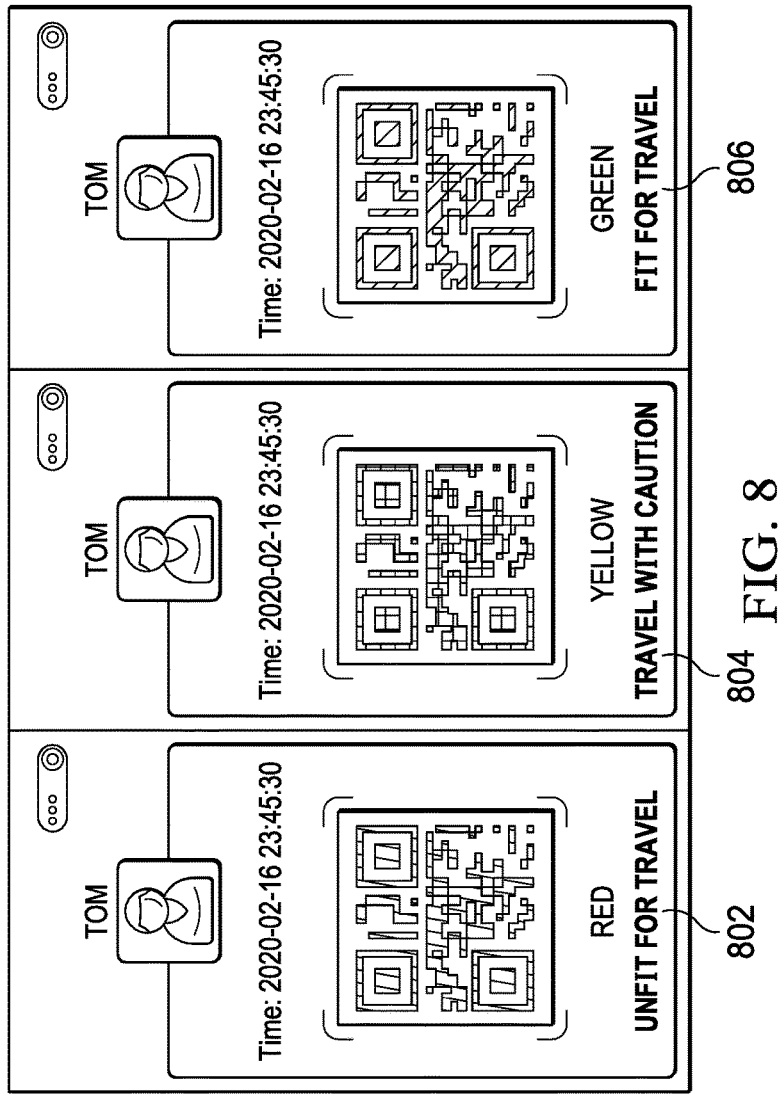
FIG. 8 illustrates examples of machine-readable passenger codes indicating health status in accordance with an illustrative embodiment.

FIG. 8 illustrates examples of machine-readable passenger codes indicating passenger health status in accordance with an illustrative embodiment. Depending on the time-stamped temperature reading of the passenger upon arrival at the transportation facility, the QR code generated by the mobile application will indicate the passenger's fitness for travel and infection risk. A temperature reading above a predefined risk threshold will be indicated as a red indication that the passenger is unfit for travel, as shown in example QR code 802. Such an indication in the QR code might deny the passenger access at the entry barriers when the QR code 802 is scanned. A yellow code 804 might indicate travel with caution and restrict the areas within a facility that the passenger is allowed to enter. A green code 806 indicates a temperature reading that indicates no infection risk and fitness to travel.

Figure 9:
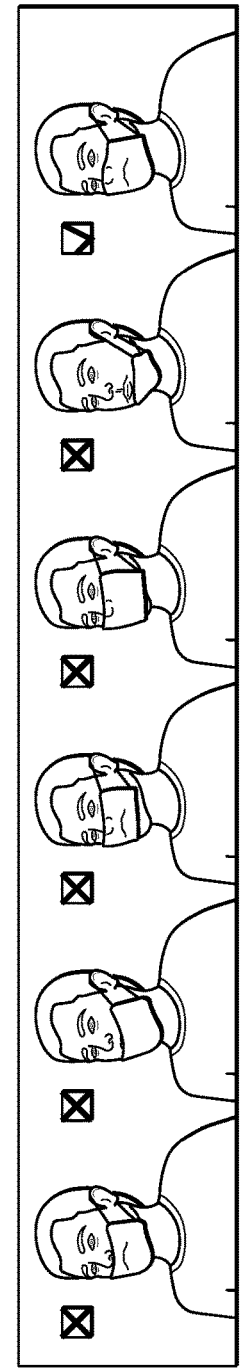
FIG. 9 illustrates example of face recognition to detect proper and improper use of face masks in accordance with an illustrative embodiment.

FIG. 9 illustrates example of face recognition to detect proper and improper use of face masks in accordance with an illustrative embodiment. Facial recognition technology incorporated into a mobile electronic device's camera (i.e. camera 156) can be used to monitor passenger compliance with proper face mask use. As shown in FIG. 9, the facial recognition can determine if a face mask is being properly worn over the nose and mouth and can distinguish and identify different types of incorrect use.

Figure 10:
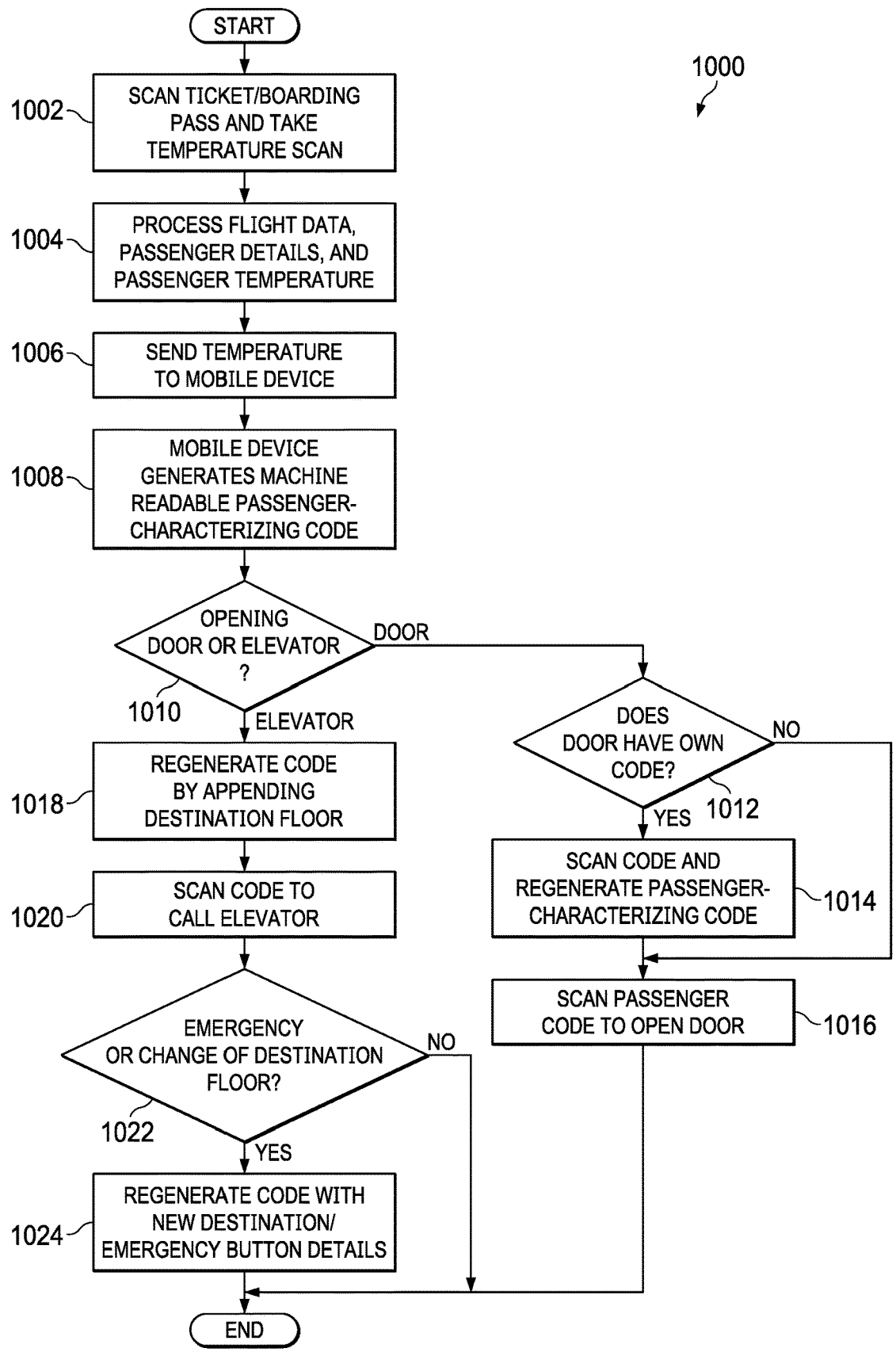
FIG. 10 illustrates a flowchart for a process of using hands-free door and elevator controls in accordance with an illustrative embodiment.

FIG. 10 illustrates a flowchart for a process of using hands-free door and elevator controls in accordance with an illustrative embodiment. Process 1000 can be implemented in hands-free access and control system 1000 and specifically in transportation facility 102.

Process 1000 begins with the passenger scanning his/her ticket or boarding pass and undergoing a temperature scan (step 1002). The security system at the entrance receives and processes both the travel related passenger data and time-stamped temperature reading (step 1004), and sends the temperature data to the passenger's registered mobile electronic device (i.e. text or email) (step 1006).

The mobile application receives the temperature data and generates a passenger-characterizing QR code that include passenger ID, travel data, and temperature (step 1008).

When approaching an entry barrier, the passenger indicates on the mobile electronic device if the entry barrier is a door or elevator (step 1010). If the entry barrier is a door, the passenger determines if there is a unique code associated with that door (step 1012). If there is a unique code of the door, the passenger scans the code, the mobile application regenerates an updated passenger QR code (step 1014), and the passenger scans the updated code (step 1016). If there is no unique code for the door, the passenger simply scans the original passenger QR code without having to regenerate the code (step 1016).

If the entry barrier is an elevator, the passenger regenerates a new passenger QR code that includes a destination floor (step 1018). The passenger then scans the code to call the elevator (step 1020). After the passenger boards the elevator, the passenger might need to call in an emergency or change the destination floor (step 1022). If so, the passenger regenerates a new QR code on the mobile electronic device with the update destination or emergency details and scans the updated code inside the elevator (step 1024). Process 1000 then ends.

Figure 11:
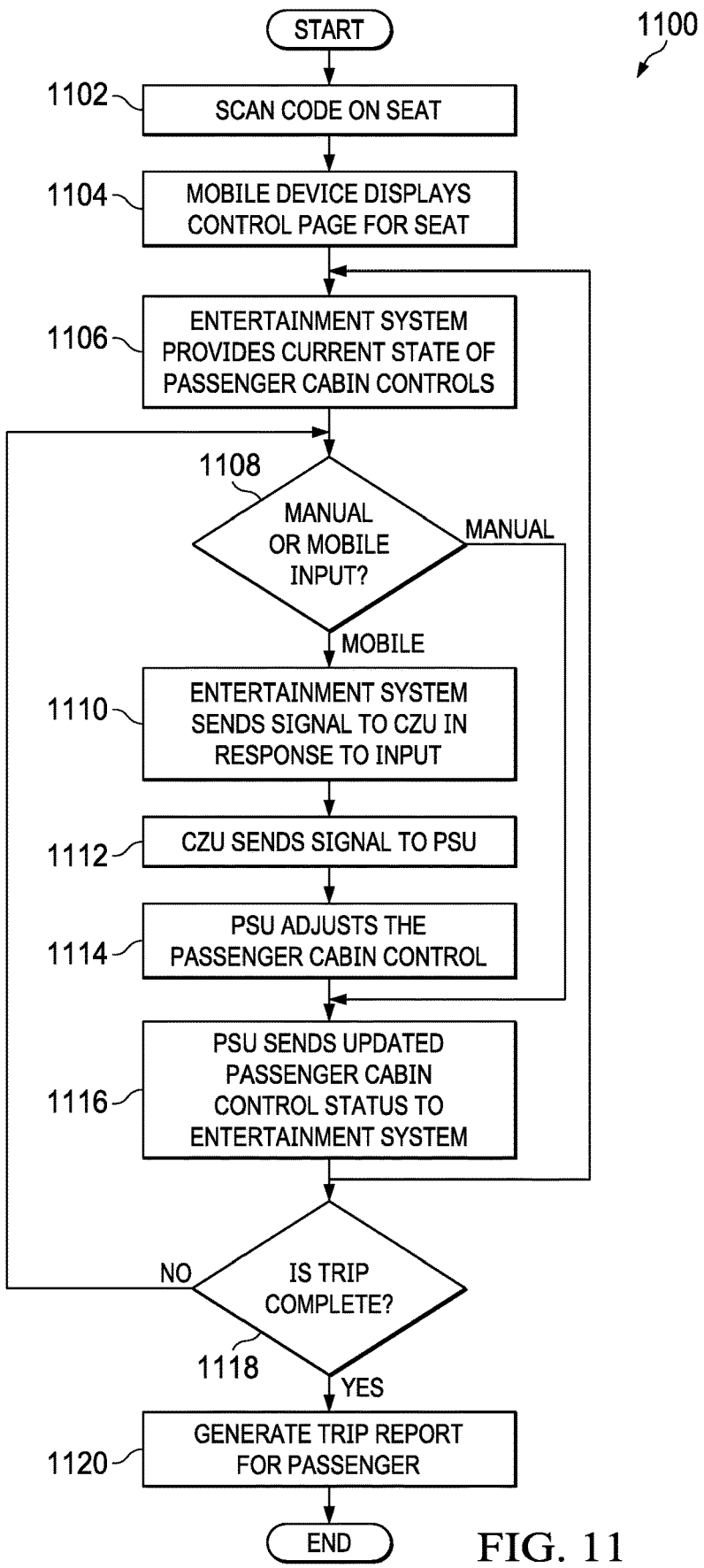
FIG. 11 illustrates a flowchart for a process of using hands-free passenger cabin controls in accordance with an illustrative embodiment.

FIG. 11 illustrates a flowchart for a process of using hands-free passenger cabin controls in accordance with an illustrative embodiment. Process 1100 can be implemented in transport vehicle 118 after the passenger has boarded.

Process 1100 begins by the passenger scanning a code on the seatback in front of the passenger's seat, which connects the passenger's mobile electronic device to the onboard entertainments system through a wireless access point (step 1102). The QR code is specified to the passenger seat. Scanning the code displays a control page for passenger cabin controls on the passenger's mobile electronic device (step 1104).

The entertainment system, which is connected to the cabin zone unit and passenger service unit, provides the current state/setting of the passenger cabin controls to the mobile electronic device (step 1006).

The passenger can input commands to the passenger cabin controls either manually or through the mobile electronic device interface that mirrors the control panel (step 1108). If the passenger uses the mobile electronic device, the entertainment system identifies passenger inputs based on changes entered through the mobile electronic device interface and sends a corresponding signal to the CZU (step 1110).

The CZU in turn sends the control signal to the PSU (step 1112). The PSU then adjusts the passenger cabin control in question (step 1114) and sends an update of the new status/setting of the passenger cabin control to the entertainment system (step 1116). If the input to a passenger cabin control is made manually, the PSU simply updates the entertainment system of the new setting.

Step 1106-1116 can be repeated until the trip is complete and the passenger de-boards (step 1118). After deboarding, the system generates a trip report for the passenger (step 1120). Process 1100 then ends. The trip report can be used for data analysis and a passenger profile in the mobile application. Based on the profile, the mobile application can automatically adjust the setting of passenger cabin controls when the passenger boards and scans a seat code on a future trip.

Figure 12:
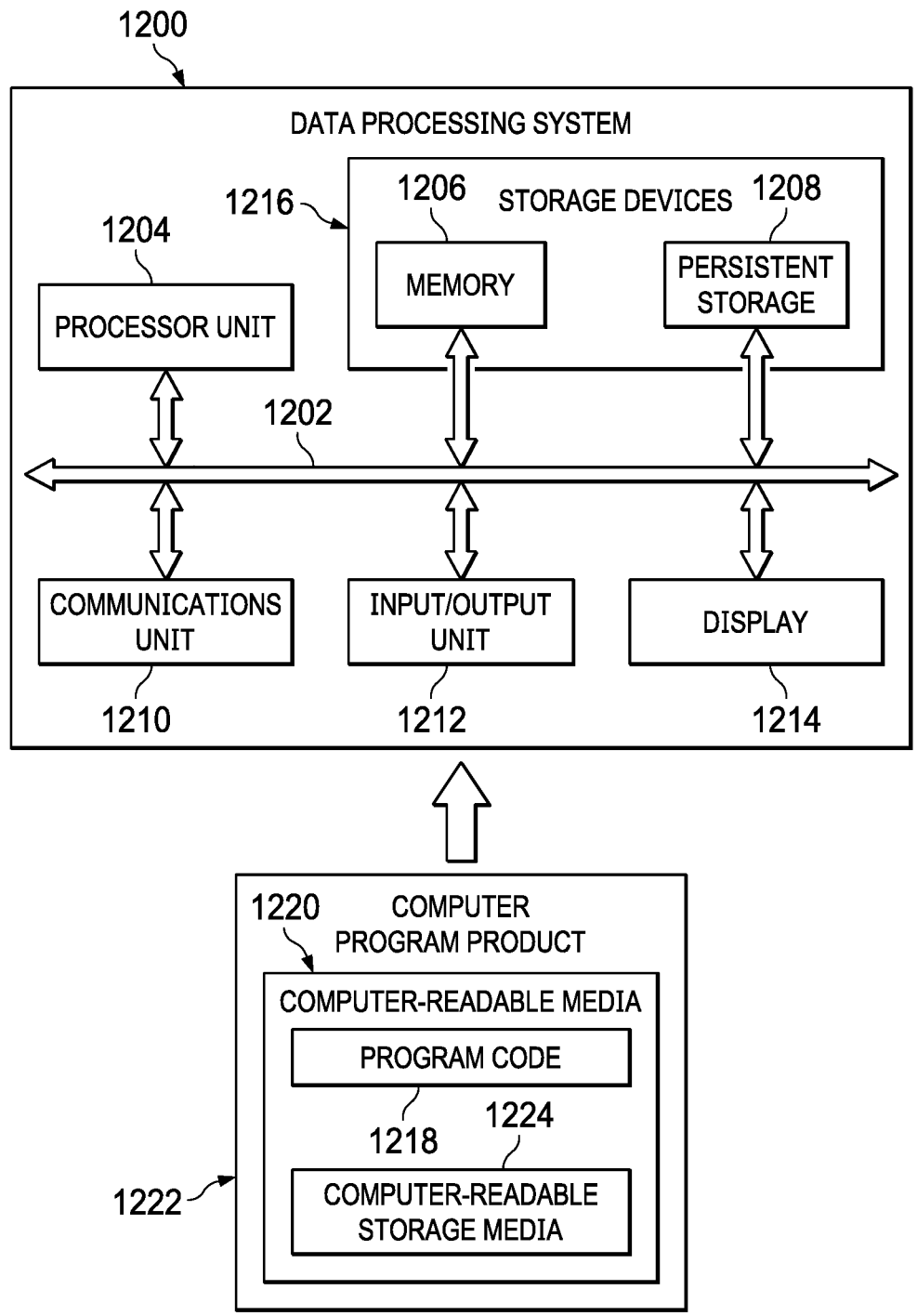
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement mobile electronic device 152, passenger service unit 126, passenger database system 170, and entertainment system 132 of FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid state hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In the illustrative example, computer-readable media 1220 may be computer-readable storage media 1224. In these illustrative examples, computer-readable storage media 1224 is a physical or tangible storage device used to store program code 1218 rather than a medium that propagates or transmits program code 1218.

Alternatively, program code 1218 may be transferred to data processing system 1200 using a computer-readable signal media. The computer-readable signal media may be, for example, a propagated data signal containing program code 1218. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

As used herein, the phrase "a number" means one or more. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. For example, the illustrative embodiments have been described with respect to mixed integrity modes, and illustrative embodiment can be applied to processors running lockstep, or other types of environments in which at least one of processing synchronization or message exchange are designed. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system enabling hands-free operation of controls for accessing a transportation vehicle, the system comprising:
    a number of code readers, each code reader associated with a respective authorized-access entry barrier for admitting passengers to a transportation vehicle, wherein the code readers are configured to read a machine-readable passenger-characterizing code generated by a mobile electronic device, wherein the code readers are further configured to actuate mechanisms allowing entry through the entry barriers responsive to successful confirmation of the passenger-characterizing code;
    a signal receiver in communication with a Passenger Service Unit (PSU) associated with a respective passenger seat onboard the transportation vehicle, wherein the signal receiver is configured to receive control instructions from the mobile electronic device and responsively instruct the PSU to actuate a number of passenger cabin controls for the passenger seat; and
    an application executable on the mobile electronic device configured to determine a time-stamped temperature of a passenger, wherein the application is configured to generate the passenger-characterizing code, wherein the passenger-characterizing code includes passenger identification, authorization to pass through the entry barriers and board the transportation vehicle, and a determination if the time-stamped temperature of the passenger is below a specified threshold indicating an acceptable passenger health status.

2. The system of claim 1, wherein the application and mobile electronic device are further configured to receive input of an adjustment to a passenger cabin control and responsively generate a signal to instruct the PSU to actuate the passenger cabin control for the passenger seat.

3. The system of claim 1, wherein the authorized access entry barriers comprise at least one of:
    a transportation facility entrance;
    a retail establishment entrance within a transportation facility;
    an elevator;
    a vehicle entrance; or
    a lavatory door.

4. The system of claim 1, wherein the passenger cabin controls comprise controls for at least one of:
    lighting;
    window dimming;
    air conditioning ventilation;
    inflight entertainment system;
    attendant call;
    food order;
    storage compartment; or
    lavatory door.

5. The system of claim 1, further comprising a machine-readable retail code associated with a retail establishment in a transportation facility, wherein the mobile electronic device is configured to read the retail code and responsively display an ordering interface for the retail establishment.

6. The system of claim 1, further comprising:
a passenger database system; and
a signal transmitter in communication with the passenger database system and configured to send a signal to the mobile electronic device, wherein the signal comprises a boarding or de-boarding schedule notice specific to the passenger identification.

7. The system of claim 1, wherein the application is further configured to:
determine through image recognition by the mobile electronic device if the passenger is wearing a safety mask in a prescribed manner; and
send a signal to the signal receiver, wherein the signal alerts a crew of the transportation vehicle if the passenger is not wearing a safety mask in the prescribed manner.

8. A method of hands-free operation of controls for accessing a transportation vehicle, the method comprising:
reading, by a number of code readers, a machine-readable passenger-characterizing code generated by a mobile electronic device, wherein each code reader is associated with a respective authorized-access entry barrier for admitting passengers to a transportation vehicle;
actuating, by the number of code readers, mechanisms allowing entry through the entry barriers responsive to successful confirmation of the passenger-characterizing code, wherein the passenger-characterizing code includes passenger identification, authorization to pass through the entry barriers and board the transportation vehicle, and a determination if a time-stamped temperature of a passenger is below a specified threshold indicating an acceptable passenger health status;
receiving, by a signal receiver, control instructions from the mobile electronic device, wherein the signal reader is in communication with a Passenger Service Unit (PSU) associated with a respective passenger seat onboard the transportation vehicle, and wherein the mobile electronic device obtains controls specific to the passenger seat by reading a code associated with the passenger seat; and
instructing, by the signal receiver, the PSU to actuate a number of passenger cabin controls for the passenger seat responsive to receiving the control instructions from the mobile electronic device.

9. The method of claim 8, further comprising the step of receiving an input, via the mobile electronic device, of an adjustment to a passenger cabin control and responsively generating control instructions for instructing the PSU associated with the respective passenger seat to actuate the passenger cabin control for the passenger seat.

10. The method of claim 8, wherein the authorized access entry barriers comprise at least one of:
a transportation facility entrance;
a retail establishment entrance within a transportation facility;
an elevator;
a vehicle entrance; or
a lavatory door.

11. The method of claim 8, wherein the passenger cabin controls comprise controls for at least one of:
lighting;
window dimming;
air conditioning ventilation;
inflight entertainment system;
attendant call;
food order;
storage compartment; or
lavatory door.

12. The method of claim 8, further comprising:
reading, by the mobile electronic device, a machine-readable retail code associated with a retail establishment in a transportation facility; and
responsively providing an ordering interface for the retail establishment on the mobile electronic device.

13. The method of claim 8, further comprising:
determining a boarding or de-boarding sequence and schedule for passengers of the transportation vehicle according to priority information in a passenger database system; and
sending a signal to the mobile electronic device, wherein the signal comprises a boarding or de-boarding notice specific to the passenger identification according to the boarding sequence and schedule.

14. The method of claim 8, further comprising:
receiving a signal from the mobile electronic device, wherein the signal indicates the passenger is not wearing a safety mask in a prescribed manner as determined through image recognition by the mobile electronic device; and
alerting a crew of the transportation vehicle that the passenger is not wearing a safety mask in the prescribed manner.

15. A method of hands-free operation of controls for accessing a transportation vehicle, the method comprising:
determining, with a mobile electronic device, a time-stamped temperature of a passenger;
generating, by an application executable on the mobile electronic device, a machine-readable passenger-characterizing code, wherein the passenger-characterizing code includes passenger identification, authorization to pass through the entry barriers and board the transportation vehicle, and a determination if the temperature of the passenger is below a specified threshold indicating an acceptable passenger health status;
displaying, with the mobile electronic device, the passenger-characterizing code to a number of code readers configured to read the passenger-characterizing code, wherein each code reader is associated with a respective authorized-access entry barrier for admitting passengers to a transportation vehicle, and wherein the code readers are further configured to actuate mechanisms allowing entry through the entry barriers responsive to successful confirmation of the passenger-characterizing code; and
sending, with the mobile electronic device, control instructions to a signal receiver in communication with a Passenger Service Unit (PSU) associated with a respective passenger seat onboard the transportation vehicle, wherein the signal receiver is configured to instruct the PSU to actuate a number of passenger cabin controls for the passenger seat responsive to receiving the control instructions from the mobile electronic device.

16. The method of claim 15, wherein the machine-readable passenger-characterizing code comprises a Quick Response (QR) code.

17. The method of claim 15, wherein the authorized access entry barriers comprise at least one of:
a transportation facility entrance;
a retail establishment entrance within a transportation facility;
an elevator;
a vehicle entrance; or
a lavatory door.

18. The method of claim 15, wherein the passenger cabin controls comprise controls for at least one of:
lighting;
window dimming;
air conditioning ventilation;
inflight entertainment system;
attendant call;
food order;
storage compartment; or
lavatory door.

19. The method of claim 15, further comprising:
reading, by the mobile electronic device, a machine-readable retail code associated with a retail establishment in a transportation facility; and
responsively providing an ordering interface for the retail establishment on the mobile electronic device.

20. The method of claim 15, further comprising receiving, by the mobile electronic device, a boarding or de-boarding schedule notice specific to the passenger identification according to a boarding or de-boarding sequence and schedule for passengers of the transportation vehicle determined from priority information in a passenger database system.

21. The method of claim 15, further comprising sending, by the mobile electronic device, a signal for a priority de-boarding request due to an authorized priority situation.

22. The method of claim 15, further comprising:
determining through image recognition by the mobile electronic device if the passenger is wearing a safety mask in a prescribed manner; and
sending a signal to the signal receiver, wherein the signal alerts a crew of the transportation vehicle if the passenger is not wearing a safety mask in the prescribed manner.

* * * * *